(12) United States Patent
Atsatt

(10) Patent No.: US 7,644,403 B2
(45) Date of Patent: Jan. 5, 2010

(54) METHOD AND SYSTEM FOR AUTOMATED ROOT-CAUSE ANALYSIS FOR CLASS LOADING FAILURES IN JAVA

(75) Inventor: Bryan Atsatt, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1012 days.

(21) Appl. No.: 11/224,893

(22) Filed: Sep. 12, 2005

(65) Prior Publication Data

US 2007/0061792 A1 Mar. 15, 2007

(51) Int. Cl.
*G06F 9/44* (2006.01)

(52) U.S. Cl. ...................................... 717/166

(58) Field of Classification Search .................. 717/140, 717/168, 166; 709/203, 208
See application file for complete search history.

(56) References Cited

U.S. PATENT DOCUMENTS

| | | | |
|---|---|---|---|
| 6,738,977 B1 | 5/2004 | Berry et al. | |
| 6,748,396 B2 | 6/2004 | Klicnik et al. | |
| 6,973,646 B1 * | 12/2005 | Bordawekar et al. | 717/146 |
| 7,035,870 B2 | 4/2006 | McGuire et al. | |
| 7,316,010 B1 | 1/2008 | Daynes et al. | |
| 7,516,331 B2 | 4/2009 | Jin et al. | |
| 2005/0028152 A1 * | 2/2005 | Hays et al. | 717/166 |
| 2005/0154785 A1 | 7/2005 | Reed et al. | |
| 2006/0070051 A1 | 3/2006 | Kuck et al. | |
| 2006/0143622 A1 | 6/2006 | Prabandham et al. | |
| 2006/0248140 A1 | 11/2006 | Birenheide | |

OTHER PUBLICATIONS

Hall, Richard S. A Policy-Driven Class Loader to Support Deployment in Extensible Frameworks 1999-2006 http://www.osgi.org.
Osgi Alliance Osgi Service Platform Core Specification Aug. 2005 http://www.osgi.org .
Krause, Jens and Plattner, Bernhard, "Safe Class Sharing Among Java Processes," Research Report, Apr. 24, 2000, http://www.zurich.ibm.com/pdf/rz3230.pdf, pp. 1-14.
OSGI Alliance, "About the OSGI Service Platform," Technical Whitepaper, Revision 3.0, Jul. 12, 2004, pp. 1-17.
Hovenmeyer , David and Pugh, William, "More Efficient Network Class Loading Through Bundling," Proceedings of the 2001 Symposium on JavaTM Virtual Machine Research and Technology Symposium—vol. 1, 2001, 13 pgs.

* cited by examiner

*Primary Examiner*—Tuan Anh Vu
(74) *Attorney, Agent, or Firm*—Townsend and Townsend and Crew, LLP

(57) ABSTRACT

A method and system for automated root-cause analysis for failures in class loading in a Java Virtual Machine (JVM) environment. Specifically, a class loader comprises a class loader for loading classes which comprises an identifier, a search policy object, a configuration policy object, and metadata. The identifier is unique to the JVM environment. The search policy object defines search procedures for discovering and loading a class by the class loader. The configuration policy object manages configuration of the class loader. Metadata describes the interrelationships between the class loader to other class loaders in a class loader tree supporting the JVM environment.

17 Claims, 8 Drawing Sheets

METHOD AND SYSTEM FOR AUTOMATED ROOT-CAUSE ANALYSIS FOR CLASS LOADING FAILURES IN JAVA

RELATED UNITED STATES PATENT APPLICATIONS

This Application is related to U.S. patent application Ser. No. 11/224,853 by Bryan Atsatt, filed on Sep. 12, 2005, entitled "Method and System for Automated Code-Source Indexing in a Java Virtual Machine Environment," assigned to the assignee of the present invention. To the extent not repeated herein, the contents of this related patent application are hereby incorporated herein by reference.

This Application is related to U.S. patent application Ser. No. 11/225,535 by Bryan Atsatt, filed on Sep. 12, 2005, entitled "System and Method for Shared Code-Sourcing in a Java Virtual Machine Environment," assigned to the assignee of the present invention. To the extent not repeated herein, the contents of this related patent application are hereby incorporated herein by reference.

This Application is related to U.S. patent application Ser. No. 11/225,143 by Bryan Atsatt, filed on Sep. 12, 2005, entitled "A Shared Loader System and Method," assigned to the assignee of the present invention. To the extent not repeated herein, the contents of this related patent application are hereby incorporated herein by reference.

This Application is related to U.S. patent application Ser. No. 11/225,144 by Bryan Atsatt, filed on Sep. 12, 2005, entitled "A Bulk Loading System and Method," assigned to the assignee of the present invention. To the extent not repeated herein, the contents of this related patent application are hereby incorporated herein by reference.

BACKGROUND OF THE INVENTION

1. Field of the Invention

Embodiments of the present invention relate to the field of class loading in a Java Virtual Machine environment. More particularly, embodiments of the present invention relate generally to automated root cause analysis of class loading failures in the Java Virtual Machine environment.

2. Related Art

Java programs are composed of named classes (e.g., "java.lang.String") and other data is referred to as resource data (e.g., "resource"). Classes and resources are loaded into a Java Virtual Machine (JVM) by a class loader. The term "class loading" refers to the process of locating the bytes for a given class name and converting them into a Java class instance. All "java.lang.Class" instances within a JVM start life as an array of bytes structured in the class format defined by the JVM specification.

Class loading is performed by the JVM during the startup process, and subsequently by subclasses of the "java.lang.ClassLoader" class. These "classloaders" provide an abstraction that allows the JVM to load classes without any knowledge of where the class bytes come from. This enables both local and remote storage as well as dynamic class generation. Furthermore, class loaders provide "dynamic-loading" capabilities that provide a great deal of extensibility to the Java language and are the basis for the mobile code capabilities of the Java language. In addition to loading classes, classloaders can be used to load native code (e.g., .dll files).

A classloader is a subclass of the "java.lang.ClassLoader" class that is responsible for loading classes. In a JVM environment class loaders are arranged in a tree hierarchy, where each class loader has a single parent. Each class loader is designed to work with one or more code-sources. For example, each classloader contains one or more code-sources that are class or resource archives (e.g., jars, zip files, etc.) from which to obtain class files to convert into class instances or resource data for application use.

A code-source is a root location from which the classloader searches for classes. Although the name implies the loading of classes only, class loaders can be used to load any file from the configured code-sources using, for example, the "getResource" and "getResrouceAsStream" methods. Code-sources can be defined to represent physical storage of binary class files, java sources that must first be compiled, or even classes generated on the fly. For example, a code-source can be a directory, a zip file, a jar file, etc.

In a Java application, there may be a number of different classloaders that use any number of different mechanisms to load classes. As an example, classloaders can be designed such that classes are retrieved from the following: a database where the configuration consists of all the data needed to point at the correct table(s) in a specific database; a remote server running a proprietary communications protocol, where the configuration consists of DNS names, ports, and other network information; a file system including a special search order specified in a properties file; sources defined within an XML file; source code (e.g., *.java) files that must be compiled, etc.

When a class load event occurs, a class loader is selected (e.g., the "initiating" classloader) to search for the class. In a standard search algorithm, the classloader searches up the parent chain in the classloader tree of the JVM environment before searching for the class in the initiating classloader. The classloader that locates and converts the class file into a class instance is referred to as the "defining" loader.

Java classes may have dependencies on other classes. The JVM may resolve these dependencies during the loading of the dependent class. On the other hand, in the interests of speed and efficiency, the JVM may defer resolution until the dependency is first required during a method execution, referred to as "lazy loading."

When a class loading error occurs, such as a required class being missing, an exception is thrown. These exceptions often cause program termination since the required class cannot be loaded. Determining the cause of such an error is often extremely difficult, particularly in environments with multiple class loaders, such as the J2EE environment. For example, the exceptions usually contain a message describing the problem. However, the message contains very little information (e.g., usually only identifying the unloadable class). This is especially true when dealing with dependent classes and their visibility.

In addition, in a JVM environment, the set of classloaders and their configurations are large, complex, and opaque to the user. Additionally, most of the code pathways are either non-debug or in native code. Also, classloading can be highly recursive, adding to the complexity in determining the sequence of events leading to the unloadable class. In addition, the exception may not be thrown when the class is loaded. Instead, the exception is thrown much later when executing the class. As a result, determining the sequence of events leading to the unloadable class to discover the source of the problem would be difficult.

SUMMARY OF THE INVENTION

A method and system for automated root-cause analysis for failures in class loading in a Java Virtual Machine (JVM) environment. Specifically, a class loader comprises a class loader for loading classes which comprises an identifier, a search policy object, a configuration policy object, and metadata. The identifier is unique to the JVM environment. The search policy object defines search procedures for discovering and loading a class by the class loader. The configuration policy object manages configuration of the class loader. Metadata describes the interrelationships between the class loader to other class loaders in a class loader tree supporting the JVM environment.

DETAILED DESCRIPTION OF THE INVENTION

Figure 1:
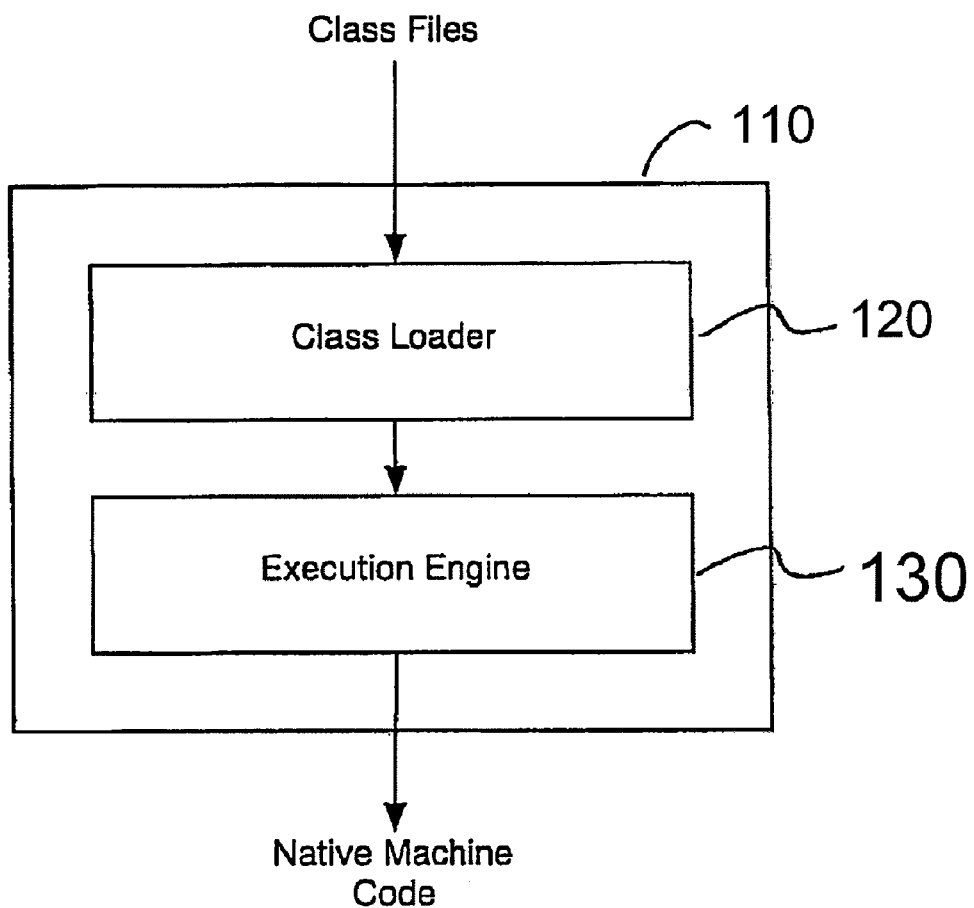
FIG. 1 is a block diagram illustrating a Java Virtual Environment (JVM) in a computing environment, in accordance with one embodiment of the present invention.

Reference will now be made in detail to the preferred embodiments of the present invention, a method and system for automated root-cause analysis for class loading failures in java, examples of which are illustrated in the accompanying drawings.

Accordingly, various embodiments of the present invention disclose a method and system for automated root-cause analysis for class loading failures in java. Embodiments of the present invention provide for additional information to be available to determine the source of class loading errors.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. This software program is operable for providing a Java Virtual Machine (JVM environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "augmenting," "determining," "discovering," and "accessing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Java Virtual Machine Environment

A JVM is an environment from which Java programs are executed. Since the JVM environment can be implemented in software, the JVM can be platform independent. As such, Java programs can be executed on any device supporting a JVM environment. In general, a Java program is expressed as source files that are compiled into Java class files. The Java class files are executed in the JVM.

FIG. 1 is a block diagram illustrating a JVM 110 in a computing environment, in accordance with one embodiment of the present invention. The computing environment can be any computing platform, such as a computer, such as a personal computer, cell phone, television, or any suitable electronic device. The JVM 110 is comprised of a class loader 120 and an execution engine 130.

The class loader 120 loads class files that are accessible by the JVM 110. For instance, the Java program is compiled into class files accessible by the JVM. These class files may be program specific, or associated with the Java application program interface (API). The Java API is composed of a set of runtime libraries of class files that are accessible to any JVM, and are platform independent. As such, the class loader loads the class files that are referred to by the Java program.

The execution engine 130 runs the class files. That is, after the JVM 110 loads class files, the execution engine 130 executes the bytecodes for the methods contained within the class files. Bytecodes can be interpreted as the machine language of the JVM. As such, the execution engine 130 translates the bytecodes from the class files into native machine code that is executable by the computing platform supporting the JVM environment.

Figure 2:
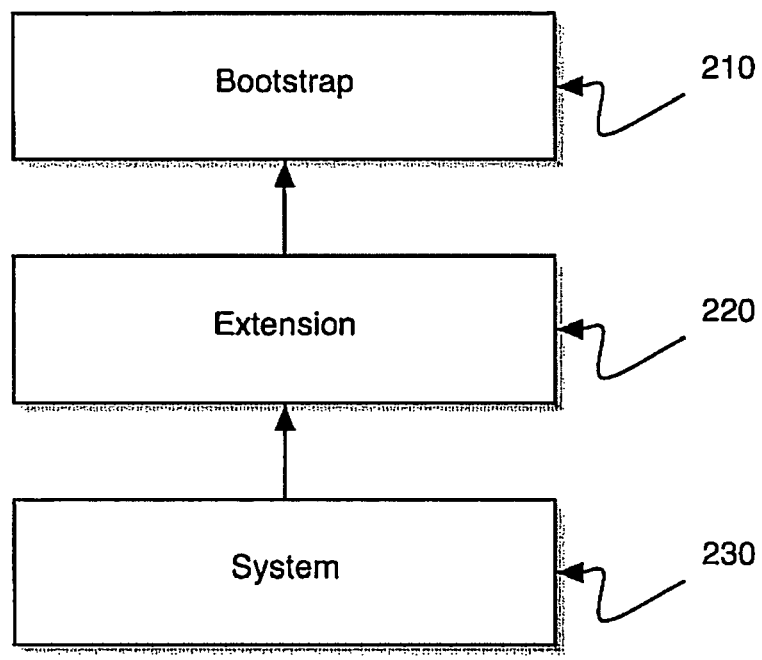
FIG. 2 is a block diagram illustrating a class loading architecture in a Java 2 Standard Edition (J2SE) environment, in accordance with one embodiment of the present invention.

FIG. 2 is a block diagram illustrating the class loading tree, or architecture, 200 in a Java 2 Standard Edition (J2SE)

environment, for example, in accordance with one embodiment of the present invention. The J2SE environment includes a bootstrap class loader 210, an extension class loader 220, and a system class loader 230.

The bootstrap class loader 210 is responsible for loading the core Java classes. The bootstrap class loader 210 is unique in that it is not actually a subclass of "java.lang.ClassLoader" but is implemented by the JVM itself. The bootstrap class loader 210 loads classes in some default manner (e.g., from a local disk).

The extension class loader 220 is responsible for loading classes from the jars in the JRE!s extension directory (e.g., jre/lib/ext or as specified by the java.ext.dirs system property). This provides a standard mechanism to introduce new functionality beyond the core Java classes introduced by the bootstrap class loader 210.

The system class loader 230 is responsible for loading classes from the directories and jars listed on the command-line and/or the "java.class.path" system property when the JVM is invoked. If not otherwise specified, any user-instantiated class loader will have this loader as its parent.

Resolving errors in the loading of classes in a J2SE environment can be relatively straightforward, as there are well defined classes with a minimum of dependencies that are loaded by the three classloaders of FIG. 2. However, class loading in a Java 2 Enterprise Edition (J2EE) environment can be quite complex since there can be multiple class loaders, thereby increasing recursiveness due to dependencies. The J2EE edition includes a rich set of services built for a server environment. Resolving class loading errors due to the recursive nature of dependencies in a J2EE environment can be time-consuming and complex. In addition, the J2EE specification defines "applications" in a flexible manner that adds important elements to the class-loading picture. Applications are component-based, co-resident but separate, and reloadable, as described below.

Class loading in the J2EE JVM environment is component based. That is, applications are not monolithic, rather they are collections of components (EJBs, Servlets, JSPs, Resource Adapters, etc.) that have predefined packaging (e.g., using JAR, WAR, and RAR files) and deployment directory structures as well as an umbrella packaging structure (e.g., EAR files).

Figure 3:
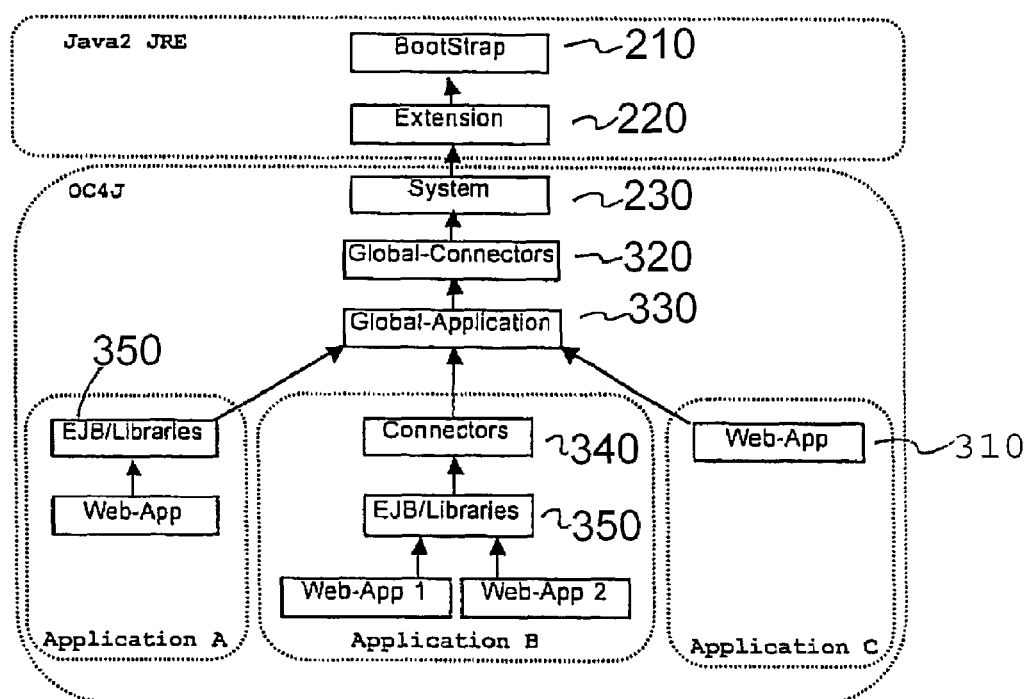
FIG. 3 is a block diagram illustrating an exemplary class loading architecture in a Java 2 Enterprise Edition (J2EE) environment, in accordance with one embodiment of the present invention.

FIG. 3 is a block diagram illustrating an exemplary class loading architecture 300 in a J2EE environment, in accordance with one embodiment of the present invention. As shown in FIG. 3, the class loading architecture of the J2SE environment is included in the bootstrap 210, extension 220, and system 230 class loaders. As such, the J2EE utilizes the default Java Runtime Environment (JRE) supplied system class loader 230 to load and launch class files.

As shown in FIG. 3, the J2EE class loading architecture 300 can be quite complex, having 3 different applications, as follows: application A, application B, and application C. Application A has a single class loader 310. Applications A and B have multiple class loaders. In J2EE each application has at least one class loader which have different configuration mechanisms that control which code-sources associated with class files end up in the class loader.

Also shown in FIG. 3 is a global connector class loader 330 that contains all code-source from RAR files referenced in the a global connector file (e.g., connectors.xml file). The global application loader contains all code-sources from any <library> tags in the global application.xml file. In application B, the "connectors" class loader 340 contains all code-sources from any application RAR files. The "ejb/libraries" class loader 350 contains all code-sources from any <ejb> tags in application.xml, and from any applicable <library> tags. The web application loader contains code-sources from WAR files, any <classpath> tags, and any <library> tags.

The system class loader 230 becomes part of the parent chain for all subsequent class loaders below it. For example, the class loaders created for the applications A, B, and C all have the system loader in their parent chain. As a result, classes bundled at the application level that also exist at the system level will never be loaded from the application using the standard search mechanism. The standard class loader search-order requires consulting the parent loader first, and any hit stops the search.

Policy Class Loaders

Embodiments of the present invention describe a new type of class loader, a policy class loader ("PolicyClassLoader"). This policy class loader is a subclass of the "java.lang.ClassLoader," in accordance with one embodiment. This new type uses composition rather than inheritance to achieve flexibility within a class loading architecture. As a result, determining solutions for class loading exception messages is straightforward.

For example, the policy class loader is able to augment exception messages with substantial information. In addition, embodiments of the present invention are able to offer concrete corrective suggestions where possible. Achieving this requires replacing all instances of class loaders, including the JVM supplied "system" and "extension" class loaders with the new type, the policy class loader, in one embodiment.

Embodiments of the present invention are well suited to supporting automated root-cause analysis for class loaders in a JVM environment. Other embodiments are well suited to supporting automated root-cause analysis for policy class loaders in a JVM environment. Furthermore, while still other embodiments of the present invention are described within the context of loading classes, other embodiments of the present invention are well suited to the context of loading resources.

Figure 4:
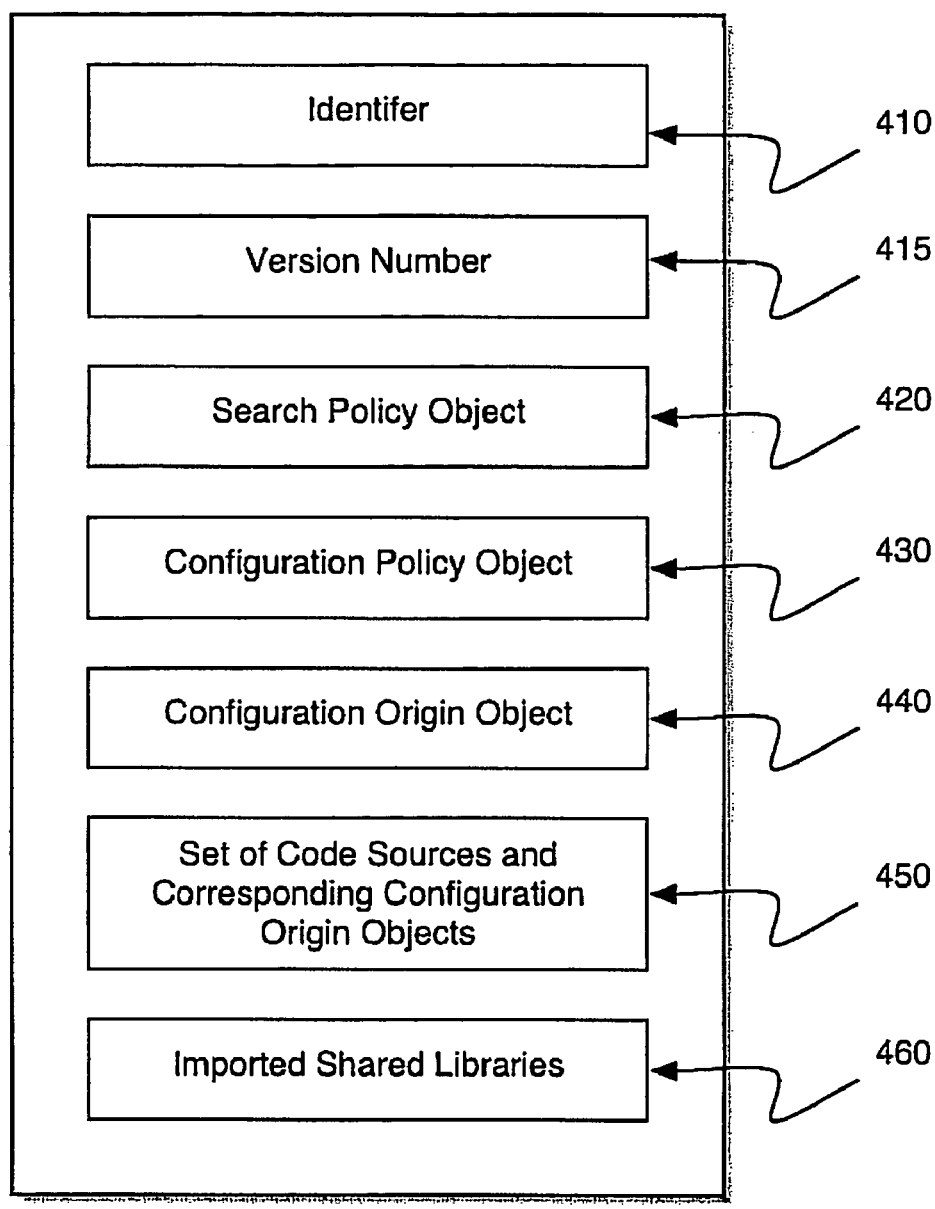
FIG. 4 is a block diagram illustrating a policy class loader that is capable of providing automated root cause analysis for class loading exceptions, in accordance with one embodiment of the present invention.

FIG. 4 is a diagram illustrating a policy class loader 400 that is capable of providing automated root cause analysis for class loading exceptions, in accordance with one embodiment of the present invention. The policy class loader 400 is provided for each class loader in a class loader tree of a Java Virtual Machine (JVM) environment. The policy class loader 400 loads classes in the JVM environment and is able to have, or have access to, new state and meta-data which is used to analyze class loading error conditions. As shown in FIG. 4, the policy class loader 400 comprises an identifier, a version number, a search policy object, a configuration policy object a configuration origin object, a set of code sources each with their own configuration origin object, and imported shared libraries.

The identifier 410 includes a descriptive name (e.g., "xml.xerces"). The version number 415 (e.g., 1.5.0) corresponds to the version of the policy class loader. The version numbers are preconfigured for some class loaders. For other class loaders, the version number is assigned by the runtime. The combination of the descriptive name and the version number (e.g., "xml.xerces" 1.5.0) is unique to the JVM environment.

The search policy object 420 defines search procedures to discover and load a class by the associated policy class loader. For example, the search policy object 420 enables composition of any set of steps required to find and load a class or resource. The instance passed to the constructor will be used by default, but alternate entry points exist that allow the policy to be passed in, thus enabling very flexible search behaviors. There are many pre-defined search policies, but other examples of search policies in addition to the standard search policy that may be defined and used by the search policy object 420 includes the following: 1) generation of source file(s); 2) compilation of source file(s); 3) index consultation for acceleration, etc.

In addition, the search mechanism could also be used to filter class access, which prevents the return of a class, based on some predefined criteria, in one embodiment.

For example, the search policy object may define the search mechanism to be a standard search mechanism, in one embodiment. The standard search mechanism searches up the parent chain to locate the class file. For instance, each class loader instance has an associated parent class loader as well as a cache for previously loaded classes. When called to load a class, the class loader, the initiating class loader, first looks in its cache, and if no class if found, it will delegate to its parent. If the parent cannot return the class, the class loader will attempt to find the class itself in its code-sources. This is a recursive process that goes to the top level in the class loader tree.

In another example, the search policy object may define the search mechanism used for web applications. That is, the class loader first looks locally to load the class. For instance, the class loader first looks for the class in the cache of the JVM. If the class is not found, then the local code-sources are examined to discover the class. If the class is not found locally, then the class is looked for in imported shared class loaders. If the class is still not found, then the class is looked for up the parent chain.

Also shown in FIG. 4 is a configuration policy object 430. The configuration policy manages the configuration of the class loader. This ensures consistent usage and provides additional meta-data for diagnostics. For example, the configuration policy object 430 may define categories for class loaders by the role of the contained classes, as follows: 1) a system class loader that contains internal classes and API classes; 2) a shared class loader for classes shared across loader hierarchies; and 3) an application class loader for application specific classes.

In addition, FIG. 4 illustrates at least one configuration origin object 440. The configuration origin object 440 comprises metadata for describing interrelationships between the policy class loader to other class loaders in the class loader tree. For example, the configuration origin object describes what configuration in the system caused this loader to be created (e.g., an application deployed in a server). That is, the configuration origin object 440 describes a generic type of configuration, such as a specific origin of the configuration origin object (e.g., file name). For instance, the configuration-origin object may include the path to the configuration file itself that caused the class loader to be created.

Also, the configuration origin object 440 of a class loader may describe all of the external configuration options that are available to modify the contents within the class loader. For instance, the object 440 may include a list of external configuration options available for modifying contents of the policy class loader.

The policy class loader 400 also includes a set of code sources 450. Each of the code sources in the set 450 is loadable by the policy class loader 400. Each code-source in the set of code sources 450 is also configured with at least one configuration origin object. The configuration origin object comprises metadata for describing interrelationships between the code-source to other classes in the class loader architecture. For example, the configuration origin object may include the path to the configuration file itself that caused the code-sources to be added to the class loader.

For example, code-sources can be labeled with the configuration option used to add it to the class loader, as well as the specific configuration file that was used. Additionally, the configuration origin object 440 specifies whether a file should be checked for code-sources. In one embodiment, a single code-source can have multiple configuration origins. For example, two different applications may reference the same code-source but have different origin files.

Additionally, generally available information used for troubleshooting is discoverable through the policy class loader 400 and provides additional configuration information that describe how a class loader is created. For example, the class loader that forms the root of the class loader tree is available and identified. Also, each class loader can provide a list of all of its children class loaders. In addition, a list of parent class loaders for a particular class loader is discoverable by walking up its parent chain. Further, class loaders are labeled with their role and scope. For instance, roles may be defined as system, application, or shared class loaders.

In addition, the class loader may include information that lists all of the code-sources contained within the class loader or is accessible by the policy class loader.

The policy class loader also includes imported shared libraries 460. The imported shared libraries disclose the concept of a shared class loader, in accordance with one embodiment of the present invention. That is, a shared class loader can be referenced by multiple loaders, but is outside of the normal parent chain.

Figure 8:
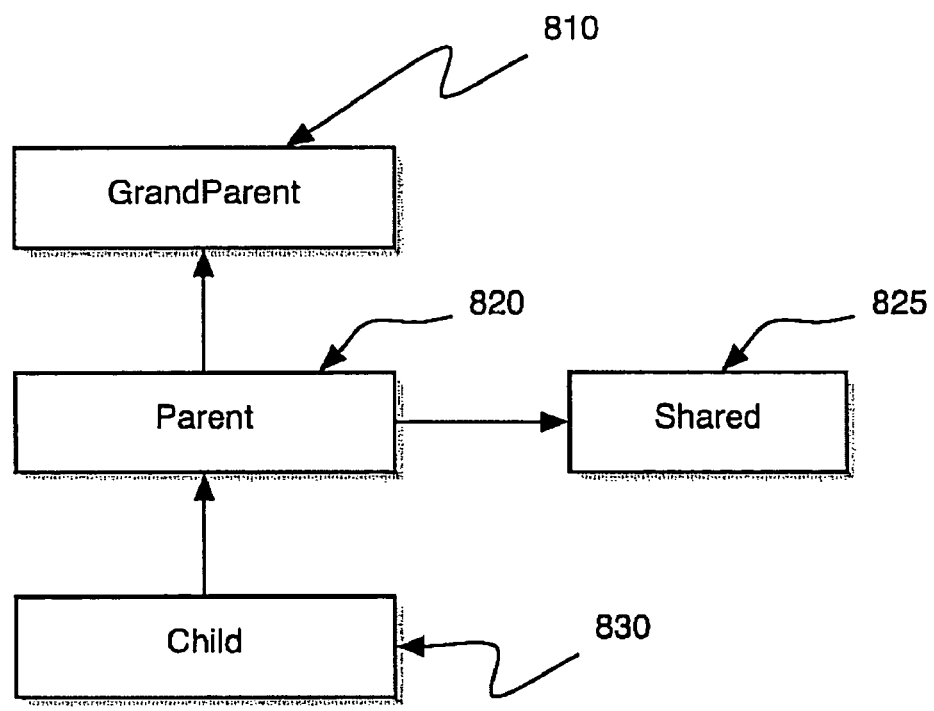
FIG. 8 is a diagram illustrating a class loader-tree 800 including shared libraries, in accordance with one embodiment of the present invention.

FIG. 8 is a diagram illustrating a class loader tree 800 including shared libraries, in accordance with one embodiment of the present invention. As shown in the class loader tree 800, a chain of class loaders includes a grandparent class loader 810, which is a parent of the parent class loader 820. In addition, the parent class loader 820 is a parent to the child class loader 830. Also, the parent class loader 820 can access the classes of the imported shared library 825. As such, a search that begins at the child class loader 830 will not see any classes from the imported shared library 825 that is shared by the parent class loader 820. However, if the search begins at the parent class loader 820, then the classes in the imported shared library 825 would be visible.

Also, additional configuration information is discoverable through various query mechanisms. That is, configuration information is accessed or searched through query mechanisms. For example, a list of classes accessible by the list of code-sources is discoverable. Further, given a specific class, all of the classes upon which that class is directly dependent is discoverable.

In another embodiment, the policy class loader further comprises a security policy. The security policy outlines protective measures taken within the class loader tree. Class loaders play a vital role in forming the association between a class instance and it's code-source. As such, the security policy of the class loader can play a vital role in securing the code-sources in the class loader tree.

While the present embodiment includes the previously defined objects for a policy class loader, other embodiments are well suited to additional objects including additional information as prescribed within the policy class loader.

Automated Root-Cause Analysis

Common problems with class loading are related to visibility in the chain of class loaders used by an application. While embodiments of the present invention are described within the context of solving two cases of exceptions, other embodiments of the present invention are well suited to solving any number of class loading exceptions.

In the case of not enough visibility, the problem occurs when a required class is not visible from within the current scope, or is not within the sequence of class loaders called by an application, for example. The sequence of class loaders includes the chain of parent class loaders and classes in shared libraries. The two exceptions thrown, for example, are the "ClassNotFoundException" and the "NoClassDefFoundException."

In the case of the "ClassNotFoundException," this exception occurs during dynamic loading, via any method that is trying to load a specific class. When the class cannot be found and loaded, the "ClassNotFoundException" is thrown.

The "NoClassDefFoundException" can be more problematic because of dependencies between classes. This exception is thrown when dependencies of a previously loaded class cannot be resolved.

In the case of resolving dependencies, the "NoClassDefFoundException" is often further obscured by lazy-loading of classes and hidden dependencies. This is illustrated in the following example. A code creates an instance of class "Foo." Buried in the code of a "Foo.doIt( )" method, "Foo" uses class "XYZ." However, class "XYZ" lives in a different package and a different jar than either "Foo" or the code. Because of lazy-loading, the class "XYZ" is not loaded initially when the code is instantiated. A "NoClassDefFoundException" is thrown when the code invokes "Foo.doit( )."

Resolving dependencies is quite difficult when there is a longer chain of dependencies, thus further separating the cause and effect. Typical exception messages of the conventional art listed only the effect, or end result of the class loading failure. The origin of the error, or the initial class to be loaded that includes a dependency or a chain of dependencies is not listed. However, embodiments of the present invention are capable of providing information to discover the origin or cause of the error, and provide solutions (e.g., providing visibility) where applicable.

Figure 5:
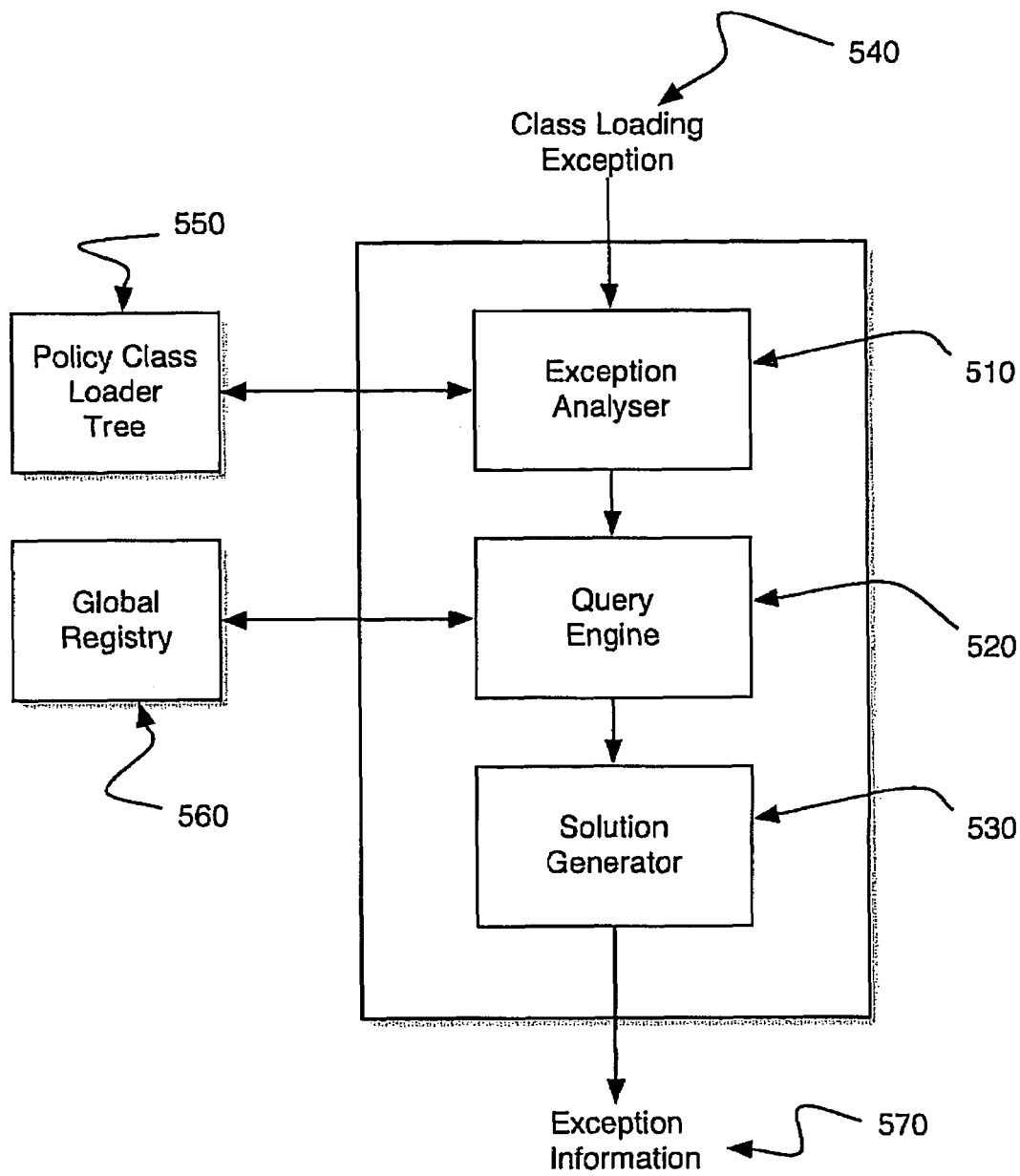
FIG. 5 is a block diagram of an analysis engine that is capable of performing root-cause analysis when examining class loading exception failures, in accordance with one embodiment of the present invention.

FIG. 5 is a block diagram of an analysis engine 500 that is capable of performing root-cause analysis when examining class loading exception failures, in accordance with one embodiment of the present invention. Embodiments of the invention take advantage of the information provided in the policies of the policy class loaders of the class loader tree to discover solutions to class loading failures. The analysis engine 500 includes an exception analyzer 510, a query engine 520, and a solution generator 530.

The analysis engine 500 is capable of implementing four distinct layers of diagnostic capabilities when examining configuration errors. The root cause analysis implemented by the analysis engine 500 is capable of providing passive diagnostics with inspection of state and metadata accessors. Passive diagnostic information includes state and metadata made available from relevant objects.

In addition, the root cause analysis is capable of providing active diagnostics with the implementation of extensible query execution. Active diagnostics take the form of "ClassLoaderQuery" objects that can utilize loader state to perform any computation desired. Queries can leverage the alternate search methods in which the search policy is explicitly passed. Normal class loader searches use the policy provided at construction time, and these will implement the standard search algorithm, including searching parent(s) and trying to load the class if not found. The alternate search methods of the present embodiment enable a query to do more focused searches, for example to return the class only if the class is found in the cache of previously loaded classes, or if the class is visible to the current class loader to exclude parents, etc.

Further, the analysis engine 500 is capable of provided monitoring of events. Monitored diagnostic take the form of event listeners. Event listeners can be registered to receive the following types of events: loader lifecycle (e.g., created, committed, and destroyed); class search results (e.g., defined, found, not-found); resource search results (e.g., found, not-found); and code-source lifecycle (e.g., created, state-changed, subscriber-changed, and destroyed).

In addition, the analysis engine 500 is capable of providing automated, extensible root-cause analysis for loading related exceptions. Class loader configuration errors nearly always surface as one of a small set of exceptions. Automated diagnostics augment the information available in the information available in the exception, including, where possible, root cause information and specific corrective instructions.

The exception analyzer 510 is able to intercept and collect a class loading exception 540. In the case of the "ClassNotFoundException" and "NoClassDefFoundException" exceptions, interception is available since they originated within the class loader. However, the exception analyzer 510 is able to process other exceptions not originating within the class loader.

The exception analyzer 510 is also able to collect the class loading exception 540. That is, the required state is collected to discover the class or method in which the exception originated. The exception analyzer 510 is able to search for well-known problems using the information contained within the policy class loaders of the class loading architecture 550 of the JVM environment, as described previously.

For example, the case of a "NoClassDefFoundException" indicates that a required dependency is unavailable. Generally, this exception simply names the class that was not found, the missing class, but does not name the class that has the dependency. For example, where the previously loaded class "A" depends on class "B," but class "B" cannot be found. In a standard environment, the error message would simply name class "B" without any further information. However, the exception analyzer 510 of embodiments of the present invention is able to include additional information gained from analyzing the metadata contained in the policy class loaders of the chain of policy class loaders associated with the unloadable class "B."

The automated diagnostics provided by the exception analyzer could include the following information gained from examining the sequence of class loaders in the policy class loader tree 550: the class that contains the dependency; the code-source of that class; the name of the loader that loaded that class; and a stack trace that identifies the code-source/loader/origin for each stack element.

Additional information obtained by the exception analyzer 510 includes the name of the missing class (e.g., class "B" of the present example). Also, the name and version number of the initiating class loader is discoverable. In addition, the exception analyzer 510 is able to determine the name of the dependent class (e.g., class "A" of the present example). Also, the name and version number of the defining loader (e.g., "alphabet.web.phonics", version 1.2) of the dependent class is discoverable. Further, the code-source (e.g., "phonics.jar" of the dependent class is discoverable. Also, the configuration option (e.g., "ejb.xml" from a specific file system path) used to add the code-source is discoverable. Furthermore, a stack trace, in which each class on the stack names its defining class loader and code-source is discoverable.

In this manner, information can be provided to find the source of the class loading error, even if the class loading architecture is complicated with multiple layers of dependencies. In addition, embodiments of the present invention are able to discover this information automatically using the exception analyzer 510.

The query engine 520 runs a query to determine if the required class is available in any loader that was not visible from the initiating loader at resolution time. That is, the query engine 520 discovers the required class in any location of the class loader tree 550. To achieve this, the query engine accesses the global registry 560 to determine if the missing class is found within the policy class loader tree 550 via the global registry 560. In one embodiment, the global registry 560 includes a collection of class loaders (e.g., policy class loaders). In another embodiment, the global registry 560 includes a collection of code-sources. In still another embodiment, all class loader instances and all code-source instances are registered in the global registry 560.

The instances of policy class loaders and shared code-sources are registered in the global registry 560. This provides access to a list of all the class loaders and code-sources in the policy class loader tree 550 without going through a class loader. As an added benefit, the global registry 560 ensures that the combination of respective identifiers and version numbers for each class is unique within the policy class loader tree 550.

In other embodiments, the query engine can be used to discover metadata pertaining to class loaders in the policy class loader tree 550 at any time. That is, the query engine is used to access the information contained within the policy class loaders of the policy class loader tree 550.

After running the query, additional information may be provided, to include the following, for example. The name of the loader(s) from which the class is available. Also, the code-source(s) can be provided from which the class is available. In addition, the configuration option(s) used to add the code-source(s) to the class loader(s) is provided.

The solution generator 530 is able to recommended a configuration change to make the missing class loader visible to the originating class loader. This solution is provided in the exception information 570 outputted by the analyzer 500. Exception information 570 also includes the information provided by the exception analyzer 510 and the query engine 520.

Figure 6:
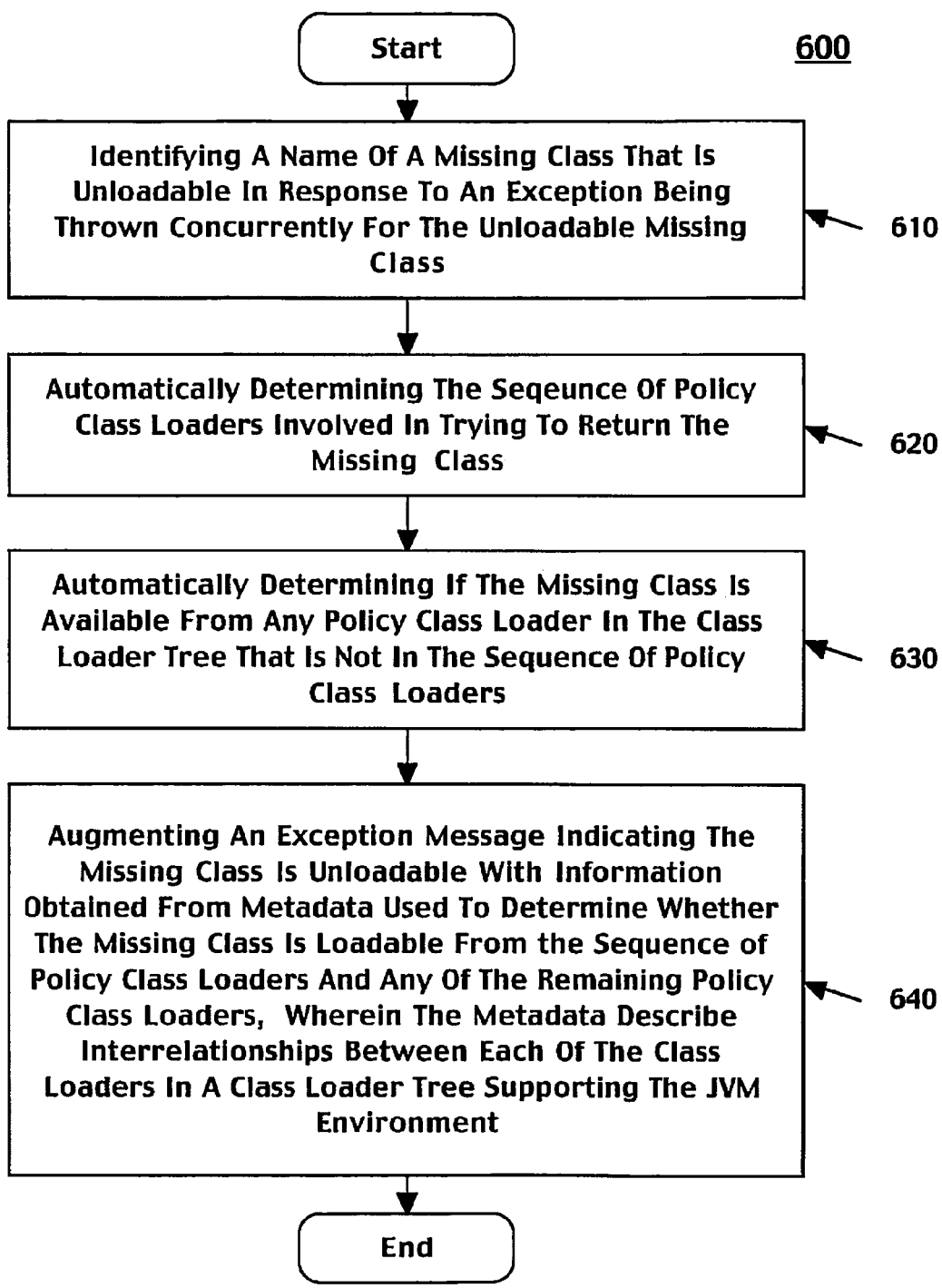
FIG. 6 is a flow diagram illustrating steps in a computer implemented method for resolving exceptions thrown by a class loader in a JVM environment, in accordance with one embodiment of the present invention.

FIG. 6 is a flow diagram 600 illustrating steps in a computer implemented method for resolving exceptions thrown by a class loader in a JVM environment, in accordance with one embodiment of the present invention. The present embodiment is able to access and analyze metadata contained within the policy class loaders as defined previously of a class loader tree. That is, each class loader in a class loader tree is enabled or replaced with a policy class loader that is populated with metadata. The present embodiment accesses the metadata to determine state and configuration information for classes in the class loader tree. Embodiments of the present invention are capable of being performed automatically, for example by an analysis engine of FIG. 5.

In one embodiment, the method of flow diagram 600 is used to determine that the class cannot be found. In another embodiment, the method of flow diagram 600 is used to determine that the class can be found.

Class loading exceptions occur when a missing class is unloadable during execution. The method of flow diagram 600 can automatically be implemented prior to, or concurrently with throwing the exception in order to provide additional information to discover and solve the source of the class loading error.

At 610, the present embodiment identifies a name of a missing class that is unloadable in response to an exception being thrown. Identification is performed concurrently with throwing the exception associated with the unloadable missing class.

At 620, the present embodiment determines the sequence of policy class loaders involved in trying to return the missing class. The sequence of policy class loaders is located within a class loader tree supporting the JVM environment. More specifically, at 620, the present embodiment discovers the source (e.g., the dependent class) of the exception message. That is, at 620, the sequence of policy class loaders involved in trying to return or load the missing class is automatically determined. The sequence includes the chain of policy class loaders and any imported shared libraries that are examined. The sequence of policy class loaders is accessed through analyzing the metadata provided by each of the policy class loaders starting from the initiating class loader trying to load the missing class. In this manner, the initiating class loader, as well as host of additional information, as previously described can be accessed and discovered.

In one embodiment of the present invention, a stack trace is executed to determine the sequence of policy class loaders, and to identify the dependent class of the missing class. That is, once the dependent class is discovered, the corresponding policy class loader and code source are also discoverable.

The stack trace contains the states of the method invocation for the current thread executing in an application. The stack trace can be contained within an execution stack accessor object that identifies all calling classes including the dependent class that throws the exception. The object is also used to identify a code-source that accesses the missing class, and the loader that accesses the code-source.

Execution of the stack trace is used to determine the dependent class when throwing exceptions. For example, execution of the stack trace can be used to determine the dependent class that throws a "ClassNotFoundException" and "NoClassDefFoundError."

As such, the present embodiment is able to automatically identify the dependent class by executing a stack trace based on the missing class to discover a sequence of class loaders. That is, by accessing the metadata contained within the sequence of class loaders, the present embodiment is able to automatically identify a dependent class of the missing class. Then, in a similar fashion, the present embodiment is able to automatically identify a defining policy class loader of the dependent class and the corresponding code source of the dependent class.

At 630, the present embodiment automatically determines if the missing class is available from any policy class loader in the class loader tree. This is accomplished by accessing the metadata for policy class loaders not in the sequence of policy class loaders. That is, the class loaders in the sequence of policy class loaders failed to load the class. As such, the present embodiment determines any remaining policy class loader in the class loader tree that is not in the sequence of policy class loaders. This is accomplished by cross-referencing the global registry which includes class loaders in the policy class loader tree. That is, the present embodiment automatically accesses the global policy class loader registry to determine which policy class loaders are not in the sequence of policy class loaders.

Thereafter, the present embodiment need only look through the code-sources of the class loaders that are not in the sequence of policy class loaders to see if the class is loadable by any of the remaining policy class loaders in the class loader tree.

At 640, the present embodiments augments the exception message, that indicates the missing class is unloadable, with information. The additional information is obtained from metadata obtained when determining whether the missing class is loadable from the sequence of policy class loaders and any remaining policy class loader in the policy class loader tree supporting the JVM environment. More generally, the metadata is available within the system and describes interrelationships between each of the class loaders in the sequence of policy class loaders, as described previously.

Moreover, the present embodiment is capable of automatically providing a configuration solution to the class loader tree so that the missing class is visible from the initiating loader in the chain of policy class loaders. That is, when the class loader can be found within the class loader tree, the present embodiment is able to solve the misconfiguration of the class loader tree.

In another embodiment, an error message is automatically sent when the missing class is not loadable from the class loader tree. That is, the missing class is not located within the global policy class loader registry, and as such, the missing class is not loadable from any policy class loader in the class loader tree.

Alternative Embodiment

Figure 7:
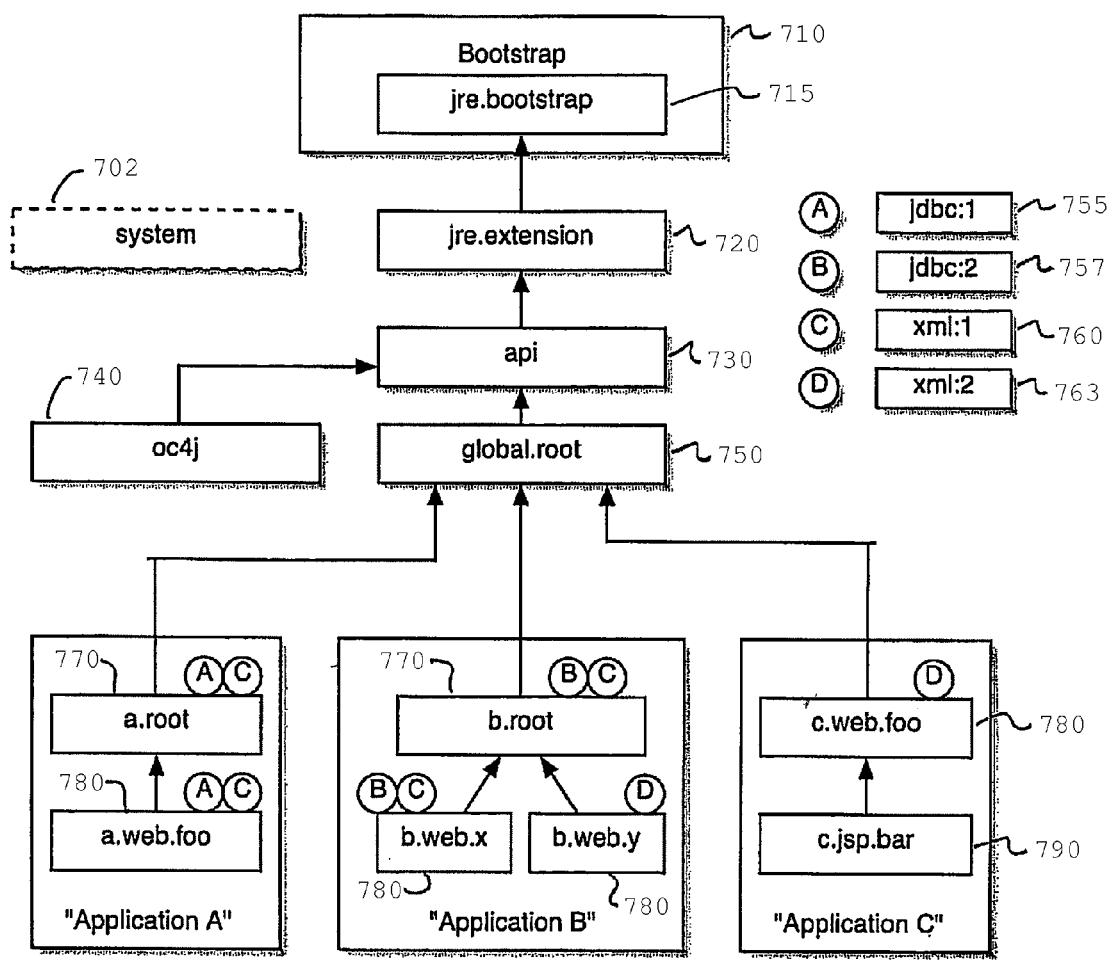
FIG. 7 is a block diagram illustrating a class loading architecture 700 that implements the new policy class loader type, in accordance with one embodiment of the present invention.

FIG. 7 is a block diagram illustrating a class loading tree 700 that implements the new policy class loader type, in accordance with one embodiment of the present invention. As shown in FIG. 7, the standard JRE loaders are replaced with the new policy class loader type. This also provides additional configuration flexibility.

While the bootstrap loader 710 cannot be replaced because it is native, the present embodiment wraps the bootstrap loader 710 with a policy class loader 715 (e.g., the "jre.bootstrap"). The "jre.bootstrap" loader 715 is a proxy for the native bootstrap loader 710 built in to the JVM. The loader 715 delegates calls to and provides diagnostics for the bootstrap loader 710. As such, the policy class loader delegates all the instructions to the bootstrap loader 710. In that way, the bootstrap loader 710 is made to look like a policy class loader through the use of the "jre.bootstrap" loader 715. That is, the bootstrap loader 710 is not directly visible at runtime. As a result, interfacing with the bootstrap loader 710 through the "jre.bootstrap" loader 715 is similar to any policy class loader.

The "jre.extension" loader 720 is a policy class loader for the JRE supplied "extension" loader.

The "api" policy class loader 730 is a replacement for the JRE supplied "system" class loader 702. The system class loader 702 is created by the java virtual machine at startup. The system class loader 702 is the default delegation parent for new user-defined class loaders created by a java application. The system class loader 702 is usually the user-defined class loader that loaded the initial class of the java application, and is the entry point that orchestrates the boot process that creates and populates the system loaders. That is, at startup, the system class loader 702 holds the bootstrap classes of the bootstrap class loader 710. Once the boot process is completed, the system class loader 702 is no longer used.

The api class loader 730 contains J2EE and Java API classes that must be visible to all applications as well to internal classes (e.g., oc4j 740 class loader). The oc4j loader 740 contains all implementation classes that should not be visible to applications.

The "global.root" policy class loader 750 is a consolidation of the "global-connector" and "global-application" loaders. The "jdbc:1" 755 and "jdbc:2" 757 policy class loaders are shared loaders containing different versions of JDBC classes. The "xml:1" 760 and "xml:2" 763 policy class loaders are shared loaders containing different versions of XML parser classes. The "<app name>.root" 770 policy class loader is a consolidation of the "connectors" and "EJB/Libraries" loaders. The "<app-name>.web.<web-mod-name>" 780 policy class loader is a web module. The "<app-name>.jsp.<jsp name>" 790 policy class loader is a JSP class loader.

Accordingly, various embodiments of the present invention disclose a method and system for automated root-cause analysis for class loading failures in java. Embodiments of the present invention provide for additional information to be available to determine the source of class loading errors.

While the methods of embodiments illustrated in flow chart 600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method for resolving exceptions thrown by a class loader in a Java Virtual Machine (JVM) environment the class loader comprising an execution-stack accessor object for identifying all calling classes including a class that throws an exception, and for identifying a code-source that accesses said class, a loader that accesses said code-source, and metadata for describing interrelationships between said class loader and other class loaders in a class loader tree, the method comprising:

replacing within a class loader architecture of the JVM environment each class loader in the class loader tree with a class loader that is populated with said metadata;

accessing said metadata by an exception analyzer of the JVM environment to determine state and configuration information for classes in said class loader tree;

identifying by the exception analyzer a name of a missing class that is unloadable in response to an exception message being thrown concurrently by the class loader for said unloadable missing class;

determining with the exception analyzer a sequence of class loaders involved in trying to return said missing class;

determining by a query engine of the JVM environment if said missing class is loadable from any remaining class loader in a class loader tree supporting said JVM environment, wherein said remaining class loader is not in said set of class loaders; and augmenting said exception message by a solution generator of the JVM environment with information obtained from metadata used to determine whether said missing class is loadable from said class loader tree, wherein determining whether said missing class is loadable from said class loader is based on accessing metadata from any of the plurality of said remaining class loaders not originally in said set of class loaders.

2. The method of claim 1, wherein said determining with the exception analyzer a sequence of class loaders further comprises:
determining a parent chain of class loaders; and
determining a shared library of parent class loaders.

3. The method of claim 1, wherein said determining with the exception analyzer a sequence of class loaders further comprises:
automatically identifying a stack trace associated with said exception;
automatically identifying said missing class in said stack trace;
automatically identifying a dependent class of said missing class; and
automatically identifying a defining class loader of said dependent class.

4. The method of claim 1, wherein said augmenting said exception message further comprises:
searching within configuration origin objects that describe interrelationships between each of the class loaders in said sequence of class loaders for said metadata.

5. The method of claim 1, further comprising:
automatically providing from the solution generator a configuration solution to said class loader tree so that said missing class is visible from an initiating loader in said chain of class loaders.

6. The method of claim 1, further comprising:
automatically sending from the solution generator an error message indicating that said missing class is not loadable in said class loader tree when said missing class is not loadable from any class loader in said class loader tree.

7. A computer system comprising:
a processor;
a bus coupled to said processor; and
a computer readable medium coupled to said bus containing instructions that when implemented cause said processor to implement a method for resolving exceptions thrown by a class loader in a Java Virtual Machine (JVM) environment the class loader comprising an execution-stack accessor object for identifying all calling classes including a class that throws an exception, and for identifying a code-source that accesses said class, a loader that accesses said code-source, and metadata for describing interrelationships between said class loader and other class loaders in a class loader tree, the method comprising:
replacing within a class loader architecture of the JVM environment each class loader in the class loader tree with a class loader that is populated with said metadata;
accessing said metadata by an exception analyzer of the JVM environment to determine state and configuration information for classes in said class loader tree;
identifying by the exception analyzer a name of a missing class that is unloadable in response to an exception message being thrown concurrently by the class loader for said unloadable missing class;
determining with the exception analyzer a sequence of class loaders involved in trying to return said missing class;
determining by a query engine of the JVM environment if said missing class is loadable from any remaining class loader in a class loader tree supporting said JVM environment, wherein said remaining class loader is not in said set of class loaders: and
augmenting said exception message by a solution generator of the JVM environment with information obtained from metadata used to determine whether said missing class is loadable from said class loader tree, wherein determining whether said missing class is loadable from said class loader is based on accessing metadata from any of the plurality of said remaining class loaders not originally in said set of class loaders.

8. The computer system of claim 7, wherein said exception message is a "ClassNotFoundException," and wherein said determining a chain of class loaders in said method comprises:
automatically discovering the last class loader implemented for loading said missing class; and
automatically and recursively discovering parent class loaders in said chain of class loaders starting from said last class loader until reaching an initiating class loader by accessing said metadata in each of said chain of class loaders.

9. The computer system of claim 7, wherein said exception message is a "NoClassDefFoundError," and wherein said determining a chain of class loaders in said method comprises:
automatically identifying a stack trace associated with said exception;
automatically identifying said missing class in said stack trace;
automatically identifying a dependent class of said missing class;
automatically identifying a defining class loader of said dependent class;
automatically and recursively discovering parent class loaders in said chain of class loaders starting from said defining class loader until reaching an initiating class loader by accessing said metadata in each of said chain of class loaders.

10. The computer system of claim 7, wherein said identifying a name and augmenting an exception message in said method are performed automatically.

11. The computer system of claim 7, wherein said method further comprises:
automatically providing a configuration solution to said class loader tree so that said missing class is visible from an initiating loader in said chain of class loaders.

12. The computer system of claim 7, wherein said method further comprises:
automatically sending an error message indicating that said missing class is not loadable in said class loader tree when said missing class is not loadable from any class loader in said class loader tree.

13. A computer readable medium containing program instructions that implement a method for resolving exceptions thrown by a class loader in a Java Virtual Machine (JVM) environment the class loader comprising an execution-stack accessor object for identifying all calling classes including a class that throws an exception, and for identifying a code-source that accesses said class, a loader that accesses said code-source, and metadata for describing interrelationships between said class loader and other class loaders in a class loader tree, said program instructions comprising:
replacing within a class loader architecture of the JVM environment each class loader in the class loader tree with a class loader that is populated with said metadata;

accessing said metadata by an exception analyzer of the JVM environment to determine state and configuration information for classes in said class loader tree;

identifying the exception analyzer a name of a missing class that is unloadable in response to an exception message being thrown concurrently by the class loader for said unloadable missing class;

determining with the exception analyzer a sequence of class loaders involved in trying to return said missing class;

determining by a query engine of the JVM environment if said missing class is loadable from any remaining class loader in a class loader tree supporting said JVM environment, wherein said remaining class loader is not in said set of class loaders; and augmenting said exception message by a solution generator of the JVM environment with information obtained from metadata used to determine whether said missing class is loadable from said class loader tree, wherein determining whether said missing class is loadable from said class loader is based on accessing metadata from any of the plurality of said remaining class loaders not originally in said set of class loaders.

14. The computer readable medium of claim 13, wherein said exception message is a "ClassNotFoundException," and wherein said determining a chain of class loaders further comprises instructions for performing:

automatically discovering the last class loader implemented for loading said missing class; and automatically and recursively discovering parent class loaders in said chain of class loaders starting from said last class loader until reaching an initiating class loader by accessing said metadata in each of said chain of class loaders.

15. The computer readable medium of claim 13, wherein said exception message is a "NoClassDefFoundError," and wherein said determining a chain of class loaders further comprises instructions for performing:

automatically identifying a stack trace associated with said exception;

automatically identifying said missing class in said stack trace;

automatically identifying a dependent class of said missing class;

automatically identifying a defining class loader of said dependent class;

automatically and recursively discovering parent class loaders in said chain of class loaders starting from said defining class loader until reaching an initiating class loader by accessing said metadata in each of said chain of class loaders.

16. The computer readable medium of claim 13, wherein said determining if said missing class is available further comprises instructions for performing:

automatically accessing a global class loader list to determine which class loaders are not in said chain of class loaders, wherein said class loader list comprises class loaders in said class loader tree; and automatically accessing metadata from class loaders not in said chain of class loaders to determine if said missing class is loadable by any of said class loaders in said class loader tree.

17. The computer readable medium of claim 16, wherein said program instructions further comprises:

accessing said meta data to determine state and configuration information for classes in said class loader tree.

* * * * *

UNITED STATES PATENT AND TRADEMARK OFFICE
CERTIFICATE OF CORRECTION

PATENT NO. : 7,644,403 B2  Page 1 of 1
APPLICATION NO. : 11/224893
DATED : January 5, 2010
INVENTOR(S) : Bryan Atsatt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

In column 5, line 12, delete "JRE!s" and insert -- JRE's --, therefor.

In column 5, line 62, before "global" delete "a".

In column 7, line 49-50, delete "configuration-origin" and insert -- configuration origin --, therefor.

In column 9, line 26, delete ""Foo.doit()."" and insert -- "Foo.doIt()." --, therefor.

In column 16, line 2, in claim 7, delete "loaders:" and insert -- loaders; --, therefor.

In column 17, line 4, in claim 13, after "identifying" insert -- by --.

Signed and Sealed this

Twenty-first Day of September, 2010

David J. Kappos
*Director of the United States Patent and Trademark Office*